No. 647,871. Patented Apr. 17, 1900.
P. C. PATTERSON.
APPARATUS FOR HANDLING TUBES OR BARS.
(Application filed July 5, 1898.)
(No Model.) 2 Sheets—Sheet 1.
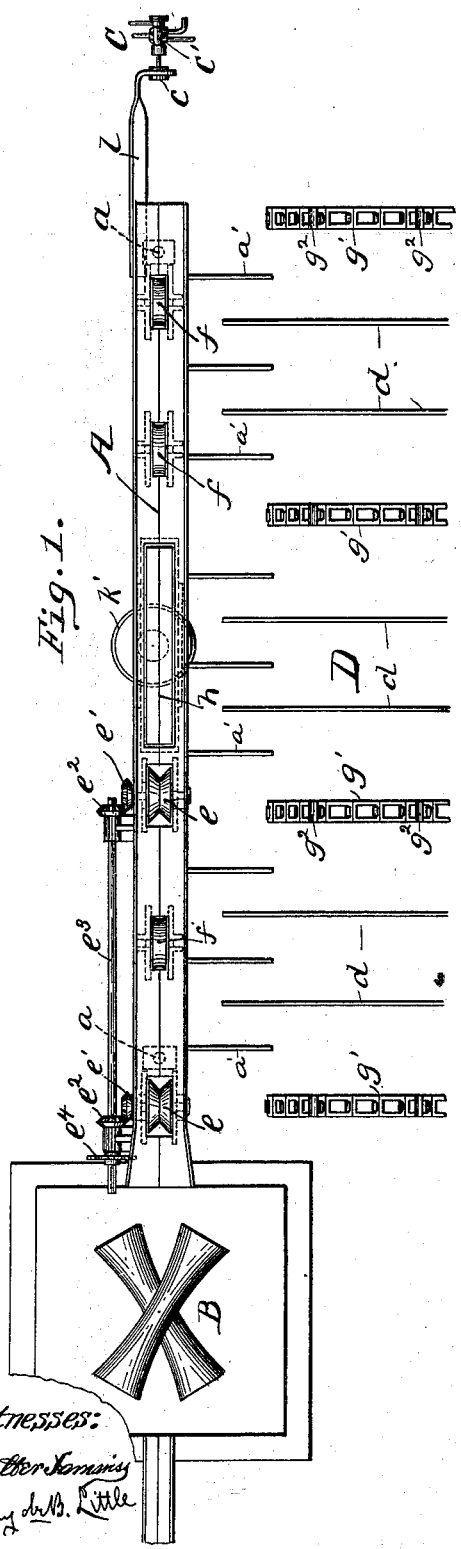
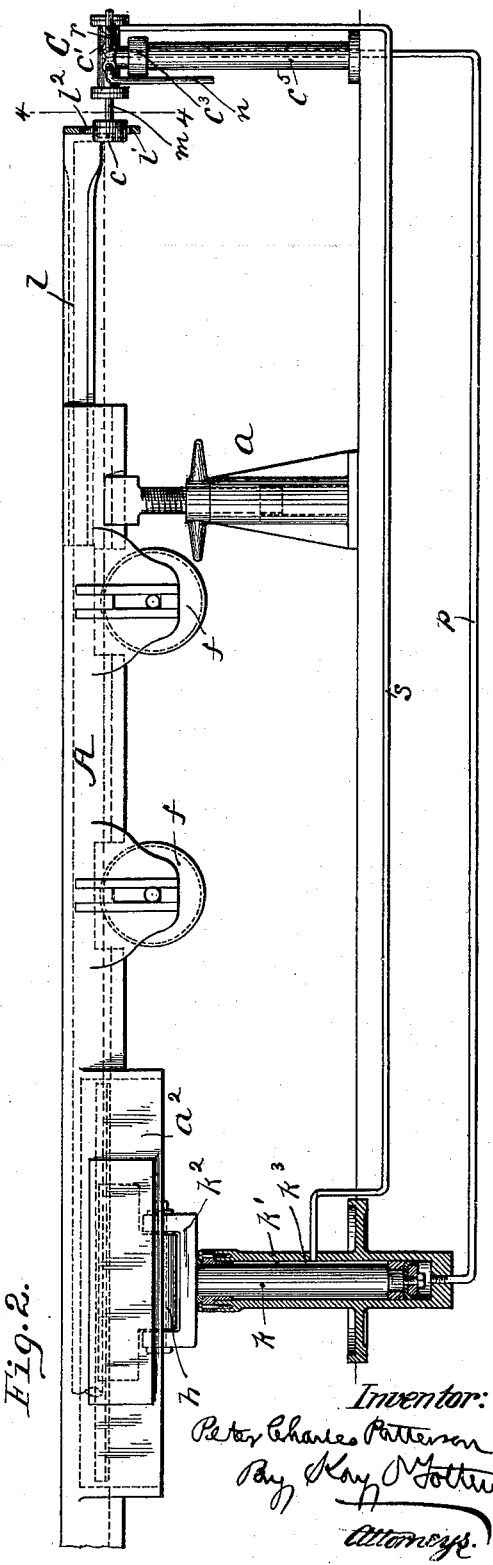

No. 647,871. Patented Apr. 17, 1900.
P. C. PATTERSON.
APPARATUS FOR HANDLING TUBES OR BARS.
(Application filed July 5, 1898.)
(No Model.) 2 Sheets—Sheet 2.
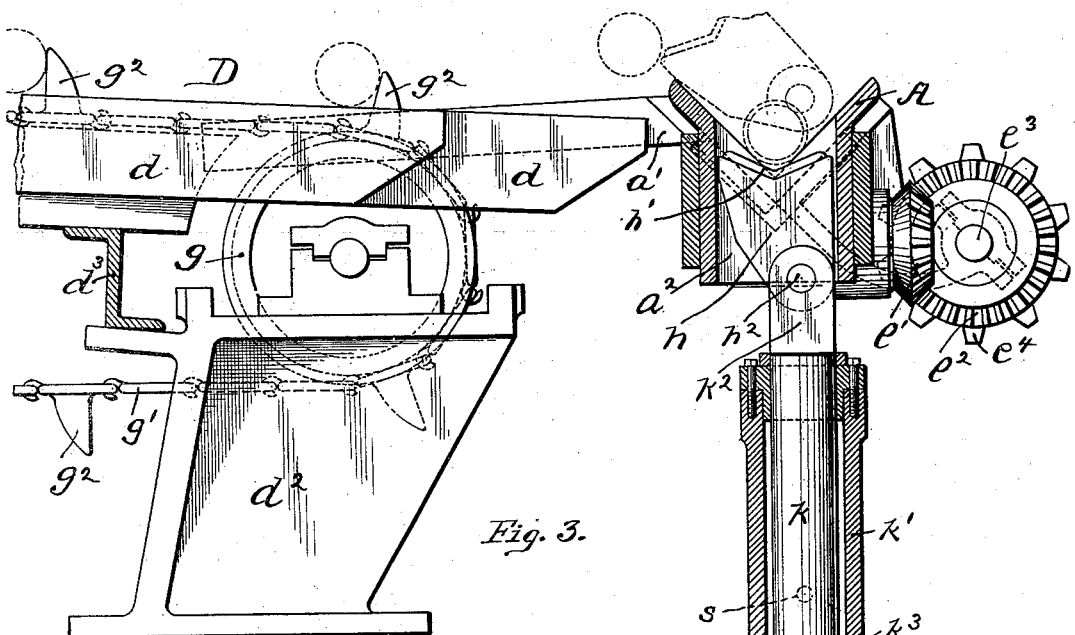
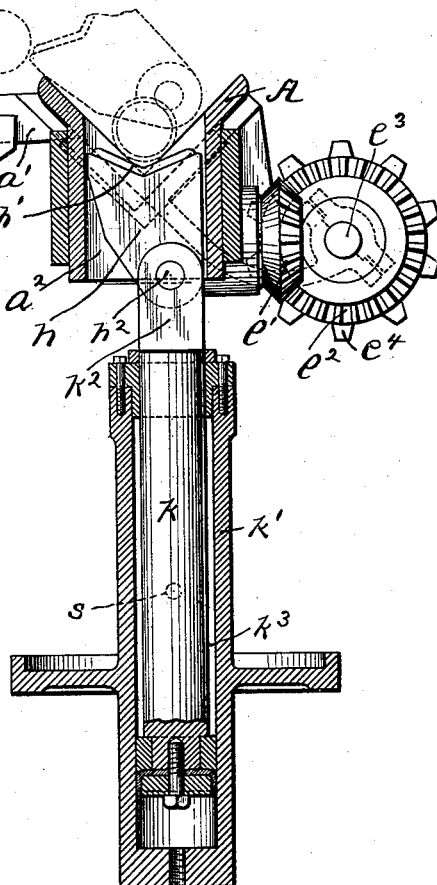
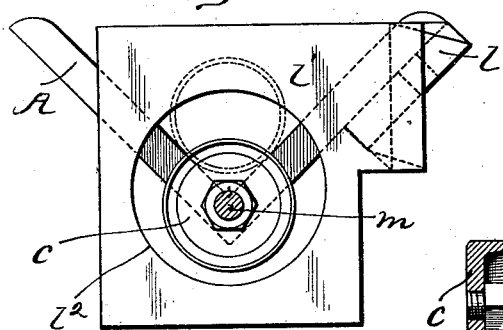
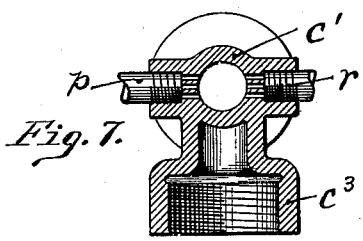
Witnesses:
Walter Samariss
Lindsay de B. Little
Inventor:
Peter Charles Patterson
By Kay & Totten
Attorneys.
THE NORRIS PETERS CO., PHOTO-LITHO., WASHINGTON, D. C.

UNITED STATES PATENT OFFICE.

PETER CHARLES PATTERSON, OF McKEESPORT, PENNSYLVANIA, ASSIGNOR TO THE NATIONAL TUBE COMPANY, OF NEW YORK, N. Y., AND PITTSBURG, PENNSYLVANIA.

APPARATUS FOR HANDLING TUBES OR BARS.

SPECIFICATION forming part of Letters Patent No. 647,871, dated April 17, 1900.

Application filed July 5, 1898. Serial No. 685,221. (No model.)

*To all whom it may concern:*

Be it known that I, PETER CHARLES PATTERSON, a resident of McKeesport, in the county of Allegheny and State of Pennsylvania, have invented a new and useful Improvement in Apparatus for Handling Tubes or Bars; and I do hereby declare the following to be a full, clear, and exact description thereof.

My invention relates to apparatus for handling tubes and bars, such as the troughs and cooling-tables used in the manufacture of tubing, its object being to provide for the discharge of the tubes from the troughs to which they are delivered by the rolls onto the cooling-tables, the work being done automatically, if desired, the apparatus also being applicable to the discharge of solid bars or rods from like receiving-troughs.

In the manufacture of tubing after the tube, whether lap-weld or butt-weld, has been welded in the rolls or bell it is generally sized by passing it through regular concave rolls of somewhat-smaller diameter than the welding-rolls or bell and then passes to what are known as "cross-rolls," which serve to bring it to true cylindrical shape. From these rolls it passes into a trough and is required to be delivered from that trough onto a suitable cooling-table.

The special object of the present invention is to provide for such delivery and to make such delivery automatic.

The invention comprises, generally stated, the combination, with the trough and the cooling-table or like apparatus, of a discharging-head rising within the trough and lifting the tube therefrom and discharging it from one side of the trough onto the cooling table or platform, the tube then rolling down into position to be engaged by the fingers carried on the traveling chains on the table by which it is gradually carried along and rotated on said table during cooling.

It also comprises suitable stop mechanism in line with the trough, by which the tube itself will automatically cause the operation of the discharging-head, such mechanism being preferably operated by fluid-pressure both for the raising of the discharging-head and for the return of the same to its normal position, the tube striking in its movement against a valve-operating disk in its course, which moves the valve to admit pressure to the ram for raising the head, and after the head is raised to the desired height the valve mechanism providing for the automatic dropping of the head to normal position, as hereinafter described.

To enable others skilled in the art to make and use my invention, I will describe the same more fully, referring to the accompanying drawings, in which—

Figure 1 is a plan view of the trough, showing the cross-rolls arranged to feed the tubing thereto. Fig. 2 is an enlarged side view of the rear end of the trough, showing in section the ram for operating the discharging-head. Fig. 3 is an enlarged cross-section showing the trough and the ram-cylinder in vertical section and the ram with its discharging-head in full lines and also showing the relative position of the same to the cooling-table. Fig. 4 is a cross-section on the line 4 4, Fig. 2, indicating the relative positions of the valve-disk, stop, and trough. Figs. 5, 6, and 7 are detail views of the valve mechanism, and Fig. 8 is a detail of a modification of the discharging-head.

Like letters indicate like parts in each of the figures.

The trough A is supported at each end on screw-jacks $a$, by which it is adjusted into proper position both in connection with the cross-rolls B and the valve mechanism C, which operates the discharging-head, hereinafter described. At the side of the trough A is the cooling table or platform D, which receives the tubes from the trough. The trough A is of proper length to receive the tube from the cross-rolls and has a number of bearings to receive both power-driven and idle rollers, the power-driven rolls $e$ being located near the receiving end of the trough and mounted in suitable bearings and carrying bevel-gears $e'$, meshing with the like bevels $e^2$ on the shaft $e^3$, which is continuously driven by a sprocket-chain passing around a sprocket-wheel $e^4$. The trough may be adjusted vertically, according to the different sizes of tubing to be received from the cross-rolls. The idle rollers $f$ are mounted in bearings in the trough and are suitably located so as to support the tube, the tube riding on these several rollers and the power-driven rollers $e$ carrying the tube against the valve-operating disk $c$ of the valve mechanism with sufficient force to operate the same, as hereinafter described. The trough A is placed at the side of the cooling-table D and carries the inclined bars $a'$, down which the tubes pass onto the table, the bars being carried by the trough, so as to provide for the adjustment of the trough, as found necessary. The cooling-table has the bars $d$, which extend at the opposite incline to the bars $a'$, said bars being supported on the bases $d^2$, such as by the angle-irons $d^3$, the table having the sprocket-wheels $g$ mounted therein, around which the chains $g'$ pass, said chains carrying the hooks or fingers $g^2$, which rise above the bars $d$ of the table and engage with the tubes and carry them along the table, rolling them over in their course, so as to expose all sides thereof, and carrying them slowly along the table to the point of discharge, so providing for their cooling. The table can be made of any desired length, according to the size of the tubing or the speed of the travel of the chain. Mounted in the trough A is the discharging-head $h$, which fits within a seat, the upper face $h'$ of the head being V-shaped, so as to center the tube thereon and control the sidewise movement of the tube in discharging it from the trough. This head may be operated by any suitable machinery which can raise it through the trough and operate it to discharge the tube at one side of the trough, as hereinafter described. I find, however, the most suitable machinery for that purpose to be a fluid-pressure ram and have illustrated the invention in connection with such ram and will so describe it. The ram $k$ is located under the trough, its cylinder $k'$ being supported in such position that as the ram-body is raised from the cylinder it will lift the head $h$ through the trough, the seat $a^2$ in the trough being of such shape as to permit the head to drop sidewise as it is lifted through the trough to discharge the tube at one side of the trough. To this end the head $h$ is connected to the ram-head $k^2$ by a pivotal joint $h^2$, which, as it will be seen, is located at the side of the head opposite to the cooling-table D, the base of the V-shaped seat $h'$, which is in the center of the head, being to one side of the center of pivot of the head upon the ram-head, so that when the head is raised through the trough it will naturally drop to one side—that is, toward the cooling-table—and as the tube is received in the V-shaped seat $h'$ of the head it will be carried by the head to one side of the trough and discharged from that side onto the cooling-table.

In Fig. 8 I have shown a modification of the head in which it is mounted to push through an opening in the side of the trough toward the opposite side thereof.

The ram can be controlled by hand, if desired; but as it is naturally called into use as soon as the trough receives a tube from the cross-rolls it is preferred to operate the same automatically, and for this purpose I have provided the following mechanism: Secured to the end of the trough and extending back some distance therefrom is the arm $l$, which carries at its rear end the stop $l'$ in the course of the tube when in the trough, and said stop $l'$ has the opening $l^2$, through which the valve-operating disk $c$ extends, said valve-disk projecting in its normal position in front of the stop $l'$, so that the tube can strike the valve-disk and force it backwardly before it strikes the stop $l'$. The valve-disk $c$ is carried on the valve-rod $m$, which extends through the valve-cylinder $c'$ and carries the operating-valves leading to points of supply and discharge, as follows: The pipe $n$ leads from the pump to the valve-cylinder, the pipe $p$ leads from the valve-cylinder to the base of the ram-cylinder $k'$, the pipe $r$ leads to the exhaust, and the pipe $s$ leads from the ram-cylinder at a suitable point in its height to the end of the valve-cylinder. The valve-rod has the elargements or pistons $m'$ $m^2$ $m^3$, located, as shown in Figs. 5 and 6, so that in its normal position, as illustrated in Fig. 6, communication is formed between the ram-pipe $p$ and the exhaust $r$ between the pistons $m^2$ and $m^3$; but when the ram is to be raised as the tube strikes against the valve-operating-disk $c$ it forces the valve-rod and its pistons back into the position shown in Fig. 5, when communication is formed between the supply-pipe $n$ and the ram-pipe $p$ between the pistons $m'$ and $m^2$. Fluid, such as air under pressure, is employed for the operation of the ram. The valve is returned to its normal position, as follows: The pipe $s$ communicates with the space $k^3$ of the cylinder $k'$, so that as the ram is raised by the fluid under pressure entering through the pipe $p$ it is lifted by the air until it passes the port of the pipe $s$, when the air passes through this pipe to the space $s'$ of the valve-cylinder back of the valve-piston $m^3$, and as there is nothing to resist the forward movement of the valve, the rod passing loosely through the valve-head $c^2$ at the opposite end of the valve-cylinder, the air forces the valve, with its valve-operating disk $c$, forward into the normal position shown in Fig. 6, so cutting off the supply of air from the pump and forming communication between the ram-pipe $p$ and the exhaust-pipe $r$ and bringing the valve-operating disk into position to be operated upon by the next tube entering the trough. The valve-cylinder $c'$ is shown as a casting having a base portion $c^3$ secured upon a standard $c^5$, extending up from the mill-floor.

In the operation of the invention with the apparatus above described the tube coming from the cross-rolls is delivered upon the rollers $e$ and $f$, and as the rollers $e$ are running continuously they feed it forward until its forward end strikes on the valve-operating disk $c$ and forces it back into the position shown in Fig. 5, when fluid under pressure from the pump passes through the pipe $n$, thence to the pipe $p$, and thence to the base of the ram-cylinder, operating to raise the ram $k$ and through it the discharging-head $h$, which as it is raised through its seat $a^2$, on account of its point of pivoting being to one side thereof, naturally drops over to one side of the trough. The tube has been delivered on the concave top face of the head, and it is held thereby as the head commences to rise, and it is finally forced by the head over against the side of the trough from which it is to be delivered and rolled by means of the head out of the trough and onto the bars $a'$, down which it rolls into position to be caught by the fingers $g^2$ of the endless chain, the corresponding fingers on the different chains engaging with a single tube and forcing it along the bars $d$ of the cooling-table, carrying it slowly to the point of discharge. When the ram $k$ rises past the port of the pipe $s$, above referred to, the air will pass through the same and operate the piston-valve $m$, forcing the same over, cutting off the supply from the pump and opening communication with the exhaust, and the ram and its discharging-head will drop back into normal position ready to operate on the next pipe.

By this apparatus I am enabled to dispense entirely with any workman to remove the pipe from the trough or to care for the pipe after it is delivered from the cross or finishing rolls and am enabled also on account of the peculiar knuckle-head or direction of movement of the discharging-head not only to raise the pipe from the trough, but to discharge the same from the side thereof in position to be taken onto the cooling-table, and to accomplish this automatically through the operation of the tube itself on the valve mechanism, thus making positive operation of the mechanism and saving the cost of one or more men.

What I claim as my invention, and desire to secure by Letters Patent, is—

1. The combination of a trough and a discharging-head so mounted therein as to rise through the trough and move to one side of the trough during its upward movement, substantially as set forth.

2. The combination of a trough, a receiving-table located at one side thereof, and a discharging-head so mounted in the trough as to rise through the same and move toward the table during its upward movement, substantially as set forth.

3. The combination of a trough, a receiving-table at one side thereof having a series of traveling chains provided with fingers, a discharging-head so mounted in the trough as to rise through the same and move toward the table in its upward movement, and guides between the trough and table, substantially as set forth.

4. The combination of a trough, a discharging-head therein, mechanism for feeding the tube longitudinally of the trough, a longitudinally-movable stop at the end of the trough and connections therefrom for automatically operating the discharging-head and thereby discharging the tube from the trough, substantially as set forth.

5. The combination of a trough, and a discharging-head therein, mechanism for raising the head in the trough and a knuckle or pivotal connection between the head and raising mechanism located within the trough and at one side of the head, substantially as set forth.

6. The combination of a trough, a fluid-pressure ram located under the trough, a discharging-head mounted within the trough and a knuckle or pivotal connection between the ram and head located within the trough, substantially as set forth.

7. The combination of a trough, a fluid-pressure ram located under the trough, a discharging-head mounted within the trough and a knuckle or pivotal connection between the ram and head located within the trough and at one side of the head, substantially as set forth.

8. The combination of a trough, a discharging-head mounted therein, a ram operating the head and valve mechanism at the end of the trough, and in the course of the tube, for operating the ram, substantially as set forth.

9. The combination of a trough, a discharging-head therein, a stop extending beyond the trough in line therewith, and automatic mechanism also in line with the trough for operating the head, substantially as set forth.

10. The combination of a trough, a discharging-head therein, a ram operating the head, and valve mechanism having a valve-disk in line with the trough for operating the ram, substantially as set forth.

11. The combination of a trough, a discharging-head therein, a ram operating the head, a stop at the end of the trough for engaging with the tube, and valve mechanism having a valve-disk also in line with the trough for operating the ram, substantially as set forth.

12. The combination of a trough, a discharging-head therein, a ram operating the head, and valve mechanism having a head or block in line with the trough, said valve mechanism having a pipe communicating with the pump, a pipe communicating with the exhaust, and a pipe leading to the ram, and a valve controlling the ports to said pipes, substantially as set forth.

13. The combination of a trough, a discharging-head therein, a ram operating the head, and valve mechanism having a head or block in line with the trough, said valve mechanism having a pipe communicating with the pump, a pipe communicating with the exhaust, and a pipe leading to the ram, and a valve controlling the ports to said pipes, and having also a pipe leading from the ram to one end of the valve for imparting reverse movement thereto, substantially as set forth.

In testimony whereof I, the said PETER CHARLES PATTERSON, have hereunto set my hand.

PETER CHARLES PATTERSON.

Witnesses:
JAMES I. KAY,
ROBT. D. TOTTEN.